United States Patent [11] 3,622,973

[72] Inventors Helmut H. Domann
Leonberg;
Klaus H. Christ, Stuttgart-Durrlewang, both of Germany
[21] Appl. No. 879,287
[22] Filed Nov. 24, 1969
[45] Patented Nov. 23, 1971
[73] Assignee Robert Bosch GmbH
Stuttgart, Germany
[32] Priority Nov. 27, 1968
[33] Germany
[31] P 18 11 192.7

[54] WHEEL SLIP DETECTION DEVICE
13 Claims, 9 Drawing Figs.
[52] U.S. Cl. ................................. 340/52 R,
303/21, 340/62, 340/262
[51] Int. Cl. ........................................ B60t 8/10
[50] Field of Search ............................. 340/62, 52,
271, 262, 263; 303/21; 324/161; 235/92 AE

[56] References Cited
UNITED STATES PATENTS
| 3,130,805 | 4/1964 | Carter et al. | 340/58 X |
| 3,146,432 | 8/1964 | Johnson | 340/263 |
| 3,233,946 | 2/1966 | Lockhart | 303/21 |
| 3,346,771 | 10/1967 | Sutton | 324/161 X |
| 3,407,399 | 10/1968 | De Long et al. | 340/271 |

*Primary Examiner*—John W. Caldwell
*Assistant Examiner*—Howard S. Cohen
*Attorney*—Flynn & Frishauf

ABSTRACT: To detect transition from rolling to sliding of a wheel over a surface, a transducer coupled to the wheel provides output pulses having a repetition rate representative of wheel speed. The pulses are applied to a logic circuit including a bistable and a monostable multivibrator. An integrating circuit controls the unstable time of the monostable multivibrator in dependence on pulse repetition rate; sudden change in pulse rate itself is sensed by applying the pulses from the bistable and monostable multivibrators to a coincidence gate which activates a wheel slip detector (and, if desired, an override control to a brake, or accelerating arrangement for the wheel).

WHEEL SLIP DETECTION DEVICE

The present invention relates to a system to detect transition of rolling to slipping of wheels over a surface, for example when the wheel is rapidly accelerated or sharply braked, and more particularly to such a system intended for association with braking, or acceleration control systems to prevent slipping of the wheel and thus skidding, or loss of tractive effort, essentially without delay.

Upon braking of moving vehicles, it is important that the wheels do not block since they then will slide over the way surface which, in case of untracked vehicles will cause skidding. The coefficient of friction between a sliding or slipping wheel and the surface is substantially less than the coefficient of friction between the wheel and the surface when is still rolling. Slipping of wheels must be avoided not only to prevent skidding, but also to maintain high braking effort. Wheels are blocked when the force from wheel to surface in the longitudinal direction of the vehicle is greater than the component of the adhesive force due to the frictional coefficient between wheel and surface, which is perpendicular to the wheel axle. This component depends on the loading of the wheel and is proportional thereto; the braking effort is initially controlled by pressure of the brake shoes against the brake drums, or brake discs, as well know.

Braking of a vehicle on a straight track causes a shift in loading weight on the wheels. The rear wheels are less loaded, the front wheels increasingly loaded, causing the well-known "brake dip." In order to avoid blocking of the rear wheels as the effective weight of the vehicle shifts, the braking effort on the rear wheels must be decreased with respect to the braking effort acting on the front wheels. To increase reliablity of braking in a curve, the braking effort on the separate wheels must further be differently distributed between transversely aligned wheels, so that the wheels at the outside of the curves are braked more effectively than those at the inner side of the curve.

The problems arising in braking of vehicles are similar to those which rise upon acceleration. Slipping, or spinning of drive wheels, upon acceleration, may cause skidding. Tracked vehicles may suffer substantial loss in running time upon spinning of drive wheels during acceleration.

Various braking control systems to sense and control braking efforts in vehicles have previously been proposed, usually inhibiting braking effort from being transmitted to the wheels if the wheels are excessively decelerated. Such deceleration of a wheel, in excess of a predetermined level, may indicate the begin of a skid. Electric pulse sources are known in which, by relative movement between an inertia body and the drive shaft of the wheel, excessive acceleration, or deceleration causes a contact element to operate furnishing an electrical pulse. The pulse source, being mechanically operated, is subject to the usual difficulties arising in connection therewith, that wear and tear, time delay, and possible malfunction due to dirt and the like. Additionally, the inherent time delay in the devices as heretofore used may be of such order that it cannot be ignored, so that sliding may occur before corrective measures in the brake, or drive system can be initiated.

It is an object of the present invention to provide a slip detection system which is not subject to wear and tear and operates essentially without any time delay.

SUBJECT MATTER OF THE PRESENT INVENTION

Briefly, the wheel (or its shaft) is provided with a noncontacting pulse source such as a rotating magnet and a fixed element such as a coil, to provide pulses which are then analyzed in a logic circuit sensing rapid change in pulse repetition rate. When the change of elapsed time between pulses deviates from a predetermined value, an output signal is derived which can be used to control a braking, or accelerating system to decrease the power (braking, or accelerating) transfer to the wheel and thus prevent wheel slip.

The logic circuit preferably includes a pair of multivibrators, one bistable and responsive to sensed pulses, and one monostable, and a coincidence circuit. The pulses derived from the transducer are applied to the first or bistable multivibrator, the output of which is connected to the coincidence circuit Additionally, the output of the bistable multivibrator is used to trigger the monostable vibrator which is so constructed, for example by having an integrator circuit connected thereto, that the unstable time of the monostable multivibrator depends on the time duration between preceding pulses; the output of the monostable multivibrator is then also applied to the coincidence circuit as a second input. Absence of a predetermined logical relationship between the pulses from the two multivibrators then cause the coincidence gate to furnish a signal, indicative of a sudden change in duration between input pulses (and, thus pulses from the bistable multivibrator) deviating from a predetermined level by a preset amount.

The invention will be described by way of example with reference to the accompanying drawings, wherein:

FIG. 1 is a schematic arrangement of the slip detection device for blocking of wheels;

FIG. 2. is a block circuit diagram of a portion of the system of FIG. 1;

Figure 1:
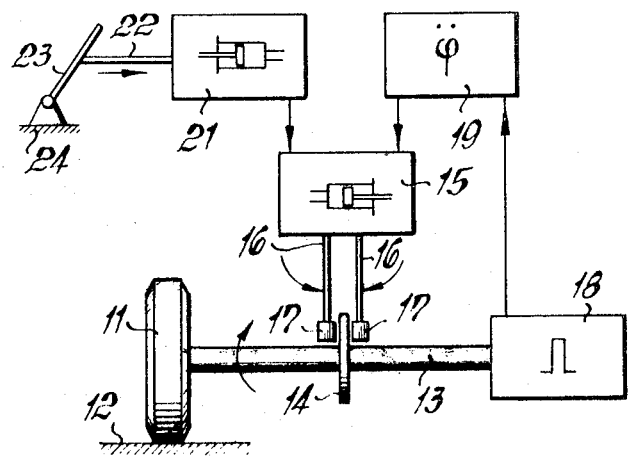

A wheel 11 rolls over a way surface 12. Wheel 11 is coupled to a shaft 13 having a brake disc 14 subject to braking effort by a pair of brake shoes 17, 17, activated over links 16, 16 from a brake cylinder 15. The action of brake cylinder 15, itself, is controlled from a brake pedal 23 secured to a fixed part of the vehicle schematically indicated at 24, and acting over a linkage 22.

A pulse source 18 is connected to shaft 13 to rotate therewith. The output of pulse source 18 is connected to a logic circuit 19 which has an output likewise controlling an additional input of brake cylinder arrangement 15.

Depression of brake pedal 23 by the operator causes braking of the vehicle. The brake pedal pressure is transmitted over linkage 22, master cylinder 21, to brake cylinder 15 and then to the wheels. If the braking effort is excessive, wheel 11 will block so that, instead of rolling, it will slip. Pulse generator 13 all the time supplies pulses. The gap (in time) between the pulses depends on the circumferential speed of wheel 11. The elapsed time between pulses is measure by circuit 19. If the change in elapsed time between pulses supplied from generator 18 exceeds a predetermined value, logic circuit 19 provides a signal which is applied to brake cylinder system 15 in such a direction that the braking effort exerted by brakeshoes 17 on brake disc 14 is decreased. The elapsed time between pulses supplied by pulse generator 18 changes with variations in speed of the vehicle, and thus changing circumferential speed of wheel 11. The amount of change in elapsed time between pulses which cause logic circuit 19 to supply an output signal to braking cylinder system 15 is made dependent on the speed of wheel 11.

Figure 2:
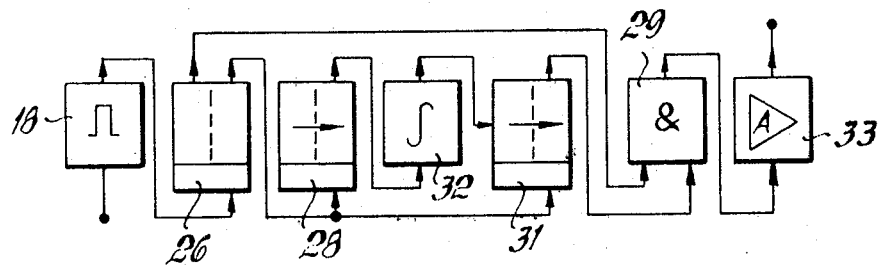

FIG. 2 illustrates the details of logic circuit 19 in block diagram form. The output of pulse generator 18 is connected to a bistable multivibrator circuit, or flip-flop 26, having a pair of outputs. One output of flip-flop 26 is connected to the input of a first monostable multivibrator (flip-flop) 28, as well as to the input of a second monostable multivibrator (flip-flop) 31. The second output of the bistable flip-flop 26 is connected to one input of a coincidence gate 29, shown as an AND-gate. The output of stage 28 is connected to an integrator 32 which is connected to, and controls the unstable period of the second monostable flip-flop 31. The output of flip-flop 31 is connected as a second input to coincidence gate 29. The output of coincidence stage 29 is connected to an amplifier 33, the output of which is utilized to control the power applied to brake cylinder 15 (or, if the slip under acceleration is to be measured, to a prime mover) to control the power transfer.

Figure 3:
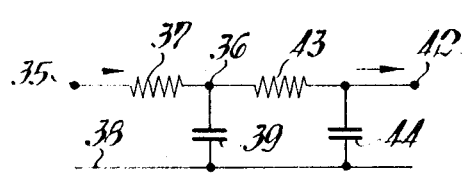
FIG. 3 is a schematic diagram of an integrating stage.

Integrator 32 is illustrated in detail in FIG. 3. Input terminal 35 is series connected with a resistance 37; the other end of resistance 37 is connected to a junction 36 which has a condenser 39 connected to a ground line 38 and one terminal of a further resistance 43 connected thereto. The other terminal of resistance 43 connects with output terminal 42 and with a condenser 44, which is likewise connected across to ground. This is a simple integrating stage which can readily be constructed as a single integrated circuit network; other integrators can be used, for example Miller integrators utilizing semiconductors.

Figure 4:
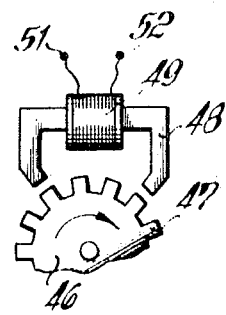
FIG. 4 is a schematic representation of a suitable transducer.

FIG. 4 shows a pulse generator. A toothed wheel 46, for example of ferromagnetic material, is connected to rotate with the wheel 13, for example by being connected to its shaft. The salient teeth 47 are located beneath a ferromagnetic yoke 48, which is horseshoe shaped and has a coil 49 having terminals 51, 52 wound therearound. Yoke 48 has a pair of pole pieces which either match teeth 47 of wheel 46, or are opposite the gaps between the teeth. A constant direct current is applied to coil 49. Depending upon the position of wheel 46, that is whether the teeth, or the gaps between the teeth are opposite the pole pieces of yoke 48, the reluctance of the path will be high or low. Thus, the inductivity of coil 49 will change periodically and the direct current through coil 49 will have an alternating-current component superimposed thereover. The alternating-current component can be taken off by means of a capacitor (not shown). Various other constructions are also possible, for example wheel 46 may have a plurality of magnets of different polarity located along its circumference. These magnets can be secured directly to a nonmagnetic wheel. Aternatively, the wheel may be made out of a material which will retain magnetism, and magnetic zones are impressed along the circumference thereof. Again, a yoke is then arranged, with a small air gap, opposite the wheel with the magnets at its circumference, the yoke having pole faces located opposite poles of opposite polarity. A coil located on the yoke will then have positive and negative voltage pulses applied thereto, the number of pulses permit time depending on the speed of the wheel.

Figure 6:
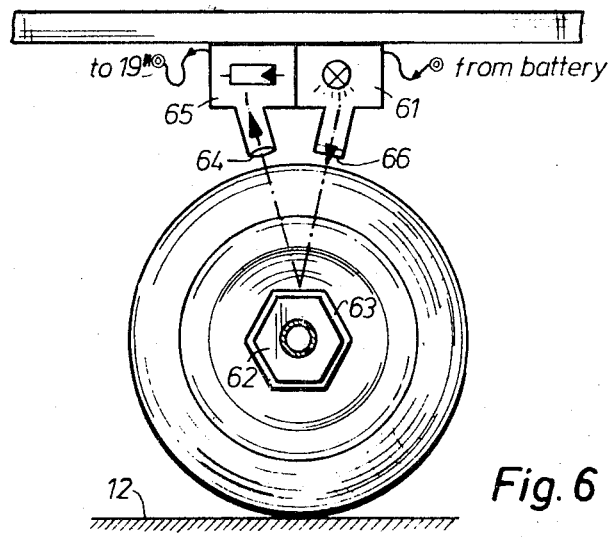
FIG. 6 illustrates, schematically, an optical scanning arrangement.

FIG. 6 illustrates an optical arrangement to detect rotation, which may be used to replace transducer 18. A lamp 61 directs a beam of light 66 towards a reflecting surface 63 of a hexagonal reflecting element, such as a prism 62. Prism 62 reflects light beam 66, which is received in an entrance lens 64 and applied to a photoelectric responsive device, such as a photo diode 65, preferably including an inherent amplification function. Upon rotation of wheel 11, six pulses for each revolution of the wheel will be obtained from photosensitive device 65. Pulses from device 65 are applied to circuit 19 (FIG. 1) as schematically indicated by terminal 19''.

OPERATION

Figure 5:
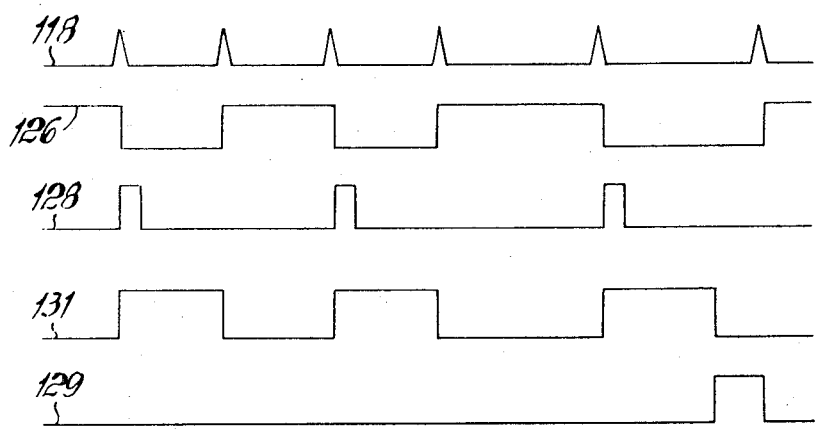
FIG. 5 is a series of timing diagrams illustrating voltage relationships in the circuit of FIG 2.

Pulses applied from transducer 18, for example taken capacitatively from coil 49, (FIG. 4), are connected to a suitable pulse-shaping circuit which may be part of the pulse generator 18, so that they will all be of uniform polarity, for example positive pulses 118 (FIG. 5). The repetition rate or, in other words, the elapsed time between pulses will be inversely proportional to the speed of wheel 11. The output pulses of pulse generator 18 trigger the bistable multivibrator stage 26, which will change state each time a pulse is obtained from the transducer 18—compare pulse diagrams 118 and 126, FIG. 5. The pulse sequence illustrated at 126 in FIG. 5 is available at the second output of bistable flip-flop 26 and applied to monostable multivibrators 28, 31. The pulse sequence at the first output of circuit 26 is exactly inverse in polarity to that of the second output and applied to the coincidence gate 29. The pulse sequence 126, applied to multivibrator 28, causes a series of pulses 128 to be obtained from circuit 28; integrator 32 integrates this pulse sequence into an average direct current potential which controls the unstable period of the second monostable multivibrator 31 in such a manner that the second monostable multivibrator 31 will change state, that is revert to its stable condition, just at the time when the bistable circuit 26 receives a new pulse from transducer 18. The output voltage obtained from the second monostable multivibrator 31 is illustrated in graph 131, FIG. 5. The pulse sequence from the second monostable multivibrator 31, that is pulse sequence 131 as well as the pulse sequence inverse to that illustrated in the graph 126 are applied to the coincidence gate 29 which will provide an output signal when there is no positive signal on either input thereto. The output from circuit 29 is illustrated at graph 129, FIG. 5. Thus, if the change in elapsed time between pulses 118 is, or, in other words, if the change in pulse length of the pulses 126 is sudden, the unstable period of the second monostable multivibrator 31 will be insufficiently long to fill the gap between succeeding pulses 128, causing circuit 29 to respond, as illustrated in the graph of FIG. 5.

Change of speed of wheel 11, which occurs upon braking, causes the second monostable multivibrator stage 31, controlled by integrator 32, to change state in such a manner that coincidence stage 29 does not become activated, since the return to stable condition of the second multivibrator 31 will be followed immediately by another pulse from the bistable stage 28. Under ordinary operating conditions, therefore, no output will be obtained from stage 29 as illustrated in the initial portion of graph 129, FIG. 5. If there is a change in the speed of wheel 11 beyond a predetermined limit, for example a change which will cause slipping of the wheel and skidding, the integrating stage 32 will not bring back monostable stage 31 to stable condition in sufficient time so that another pulse from first multivibrator 128 will be available to block coincidence stage 29. Amplifier 33, which may control electromechanical, or electrohydraulic apparatus, can effect direct corrective action on braking cylinder system 15 upon presence of pulses 129.

The circuits themselves can be so designed that small changes in the pulse shape or pulse width of the trailing edges of the pulse sequence 131 do not affect coincidence stage 29 and cause it to become operative and such that minor variations in circuit components will have no influence on the operation of the circuit.

The system according to the present invention has the advantage that it can operate with a pulse generator which does not have mechanically moveable switches, so that a pulse source free of any wear and tear can be used, and reliable operation is ensured over the entire life of the equipment. The system of the present invention responds practically without any delay, and can act on the brake, or drive system immediately when wheel slippage might occur. Utilizing digital pulses in the control circuit has the additional advantage that stray noise currents do not influence the operation. Acceleration (or deceleration) measuring devices utilizing differentiating stages are subject to noise pulses and may give false readings upon presence of superimposed AC components in the current supply lines, which are sometimes present in vehicle supply systems. The arrangement in accordance with the present invention further automatically takes into consideration that a higher braking (or accelerating) effort may be applied to the wheels before they will block, or slip through, respectively, if the vehicle carries a heavier load. Additionally, the arrangement in accordance with the present invention is independent of the surface condition of the way on which the wheel 11 runs, that is whether the road 12 is, for example dry, wet, or icy.

Reduced to essentials, the system of the present invention compares the individual elapsed time between a pulse and the immediately preceding pulse with the average elapsed time between a series of pulses. If this individual elapsed time period differs from the average by an excessive amount (lack of overlap of pulses 128 and 131) circuit stage 29 responds.

Figure 7:
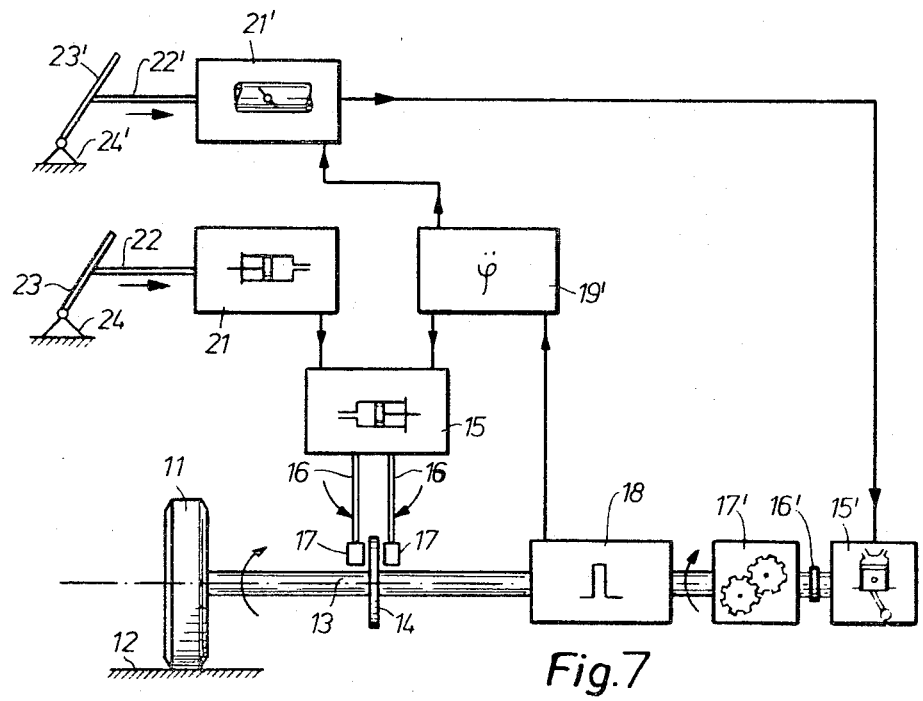
FIG. 7 is a schematic arrangement of the slip detection device to detect spinning of a wheel.

Slipping of the wheel due to excessive accelerating forces, causing spinning or turn-through can be detected by a modification of the system, as illustrated in connection with FIGS. 7, 8 and 9, where elements similar to those previously described, but additional thereto have been given similar reference numerals, but with a prime mark. Elements previously discussed and described will not be referred to again.

Upon operation of an acceleration controller, such as a gas pedal 23', to cause acceleration of the vehicle, linkage 22' will open a controller 21', located in a fuel injection, or carburetor system for an internal combustion engine. A0 the throttle opens, motor 15' will provide increased torque which, transmitted over a clutch 16' and transmission 17' is applied to shaft 13 to drive the wheel. Wheel 11, as before, has the pulse transducer 18 arranged thereon (which may, if desired, take the form of the arrangement discussed in connection with FIG. 6) which provides output pulses to circuit 19'. If the acceleration commanded by controller 23' is excessive, so that wheel 11 may spin, an output signal is obtained from the circuit 19', which is applied to the linkage to the fuel controller 21', or inherently to the fuel controller, to cause a lesser amount of fuel to be supplied to the engine, for example by closing of the throttle valve. Closing of the throttle valve, or decrease of the amount of fuel will lower the torque of motor 15' and thus decrease the acceleration and avoid spinning.

Figure 8:
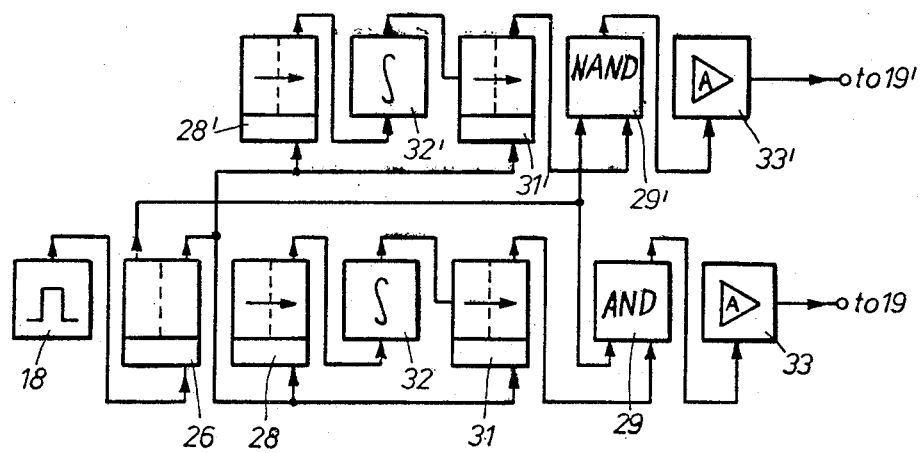
FIG. 8 is a block circuit diagram for use in the system of FIG. 7.
Figure 9:
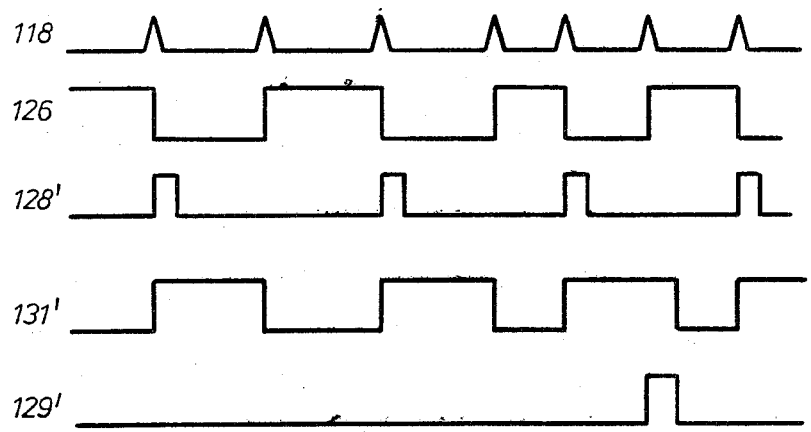
FIG. 9 is a series of timing diagrams illustrating voltage relationships in the circuit of FIG. 8.

The operation of the circuit in accordance with FIG. 8 is similar to that in accordance with FIG. 2. A second logic network having two monostable multivibrators 28' and 31' is provided, connected to a NAND-circuit 29'. The additional integrating stage 32' individual to the second logic network increases reliability. The length of the output pulses 131', as seen in FIG. 9, can be independent of the length of the output pulses 131 (FIG. 5) from circuit 31. FIG. 9 illustrates the output pulses 129' of NAND-gate 29', which, applied over an amplifier 33' control the supply of fuel by device 21'.

The present invention has been described in connection with a wheel slip detection device for use in a vehicle operation by an internal combustion engine; the nature of the power supply, and the type of brakes used are independent of the present invention and, without departing from the scope of the inventive concept, suitable design modifications may be made to control any type of prime mover or brake system.

We claim:

1. Slip detection device to detect transition from rolling to slipping of a wheel (11) over a surface (12) upon acceleration, or deceleration of the wheel, comprising transducer means (18) coupled to the wheel and providing output pulses (118) having a repetition rate representative of wheel speed;

a bistable multivibrator circuit (26) connected to said transducer means and triggered thereby, said bistable circuit (26) changing state upon occurrence of each pulse;

circuit means (28, 31, 32) connected to the output of said bistable multivibrator circuit whereby said circuit means will have pulses having a repetition rate proportional to said repetition rate representative of wheel speed applied thereto, said circuit means sensing elapsed time between pulses;

means (29) sensing change of elapsed time between pulses exceeding a predetermined amount of change, said sensing means having its input connected to the output of said bistable multivibrator circuit and to said circuit means (28, 31, 32) sensing elapsed time between pulses; and means (33) deriving an output signal from said sensing means.

2. Device according to claim 1, wherein said means sensing the change of elapsed time includes a coincidence gate (29); and said circuit means includes a first monostable multivibrator (28), and a second monostable multivibrator (31);

the pulses (126) from said bistable multivibrator (26) being connected to said first monostable multivibrator (28) and to said second monostable multivibrator (31), the output of said bistable multivibrator being further applied to said coincidence gate (29);

the output of said second multivibrator (31) being applied to a second input of said coincidence gate (29);

and said second multivibrator (31) has an unstable time representative of elapsed time between pulses applied thereto by said bistable multivibrator (26).

3. Device according to claim 2, wherein the pulses applied to the input of said second monostable multivibrator (31) are connected through said first monostable multivibrator (28).

4. Device according to claim 2, including an integrating network having the pulses representative of the pulses from said bistable multivibrator (26) applied thereto and controlling the unstable period of said second monostable multivibrator (31).

5. Device according to claim 1, in combination with a vehicle braking system, said means (33) deriving an output signal being connected to the vehicle braking system and supplying a control signal thereto upon detection of change of elapsed time between pulses in excess of a predetermined value.

6. Device according to claim 1, wherein said transducer means includes a magnetic transducer wheel mechanically coupled to said wheel (11), said transducer wheel having intermittently magnetic material located along its circumference;

and a yoke cooperating with said intermittent magnetic material, and a coil associated therewith, said coil having pulses induced therein upon rotation of said transducer wheel with respect to said yoke.

7. Device according to claim 6, wherein said transducer wheel comprises a plurality of magnets located at the circumference thereof, and of adjacent opposite polarity, and located in a magnetic circuit with said yoke.

8. Device according to claim 6, wherein said transducer wheel comprises a plurality of salient poles of ferromagnetic material and said coil is connected to a source of direct current.

9. Device according to claim 1, wherein said transducer means includes an optical transducer having a source of light and a light-sensitive element, and a movable reflector secured to rotate with said wheel (11) and reflecting light from said source to said photosensitive element, intermittently, upon rotation of said wheel.

10. Device according to claim 1, wherein said circuit means includes an integrating circuit (32) having pulses with a repetition rate proportional to the repetition rate of the pulses from said bistable multivibrator applied thereto and providing an electrical representation of average elapsed time between said pulses;

and said means sensing change of elapsed time between pulses includes a coincidence circuit connected to and comparing the elapsed time between adjacent pulses (126) from said bistable multivibrator (26) with said electrical representation of averaged elapsed time.

11. Device according to claim 10, wherein said circuit means includes a monostable flip-flop circuit (31), said integrating circuit (32) controlling the duration of unstable state of said flip-flop circuit (31) in accordance with an integrated value of elapsed time between a plurality of pulses;

and said coincidence circuit compares the timing of the output (131) of said monostable flip-flop circuit (31) with the occurrence, in time, of the output pulses (126) from said bistable multivibrator circuit (26).

12. Device according to claim 1, in combination with a vehicle-driving system (15', 16', 17'), said means (33') deriving an output signal being connected to the vehicle-driving system and supplying a control signal thereto upon detection of increase of repetition rate of pulses in excess of a predetermined value.

13. Device according to claim 5, further in combination with a vehicle driving system, a pair of integrating circuits (32, 32') having pulses with a repetition rate proportional to the repetition rate of said output pulses applied thereto, each said integrating circuits providing an electrical representation of average elapsed time between pulses;

and said means sensing change of elapsed time between pulses including first coincidence circuit comparing elapsed time between adjacent pulses with said electrical representation of average elapsed time and a second coincidence circuit comparing repetition rate with said electrical representation of average elapsed time.

* * * * *